July 4, 1933. M. JONES 1,916,982
FLY DESTROYER
Filed Jan. 25, 1932

Inventor:
Margaret Jones
By Milo B. Stevens & Co.
Attys.

Patented July 4, 1933

1,916,982

UNITED STATES PATENT OFFICE

MARGARET JONES, OF MILWAUKEE, WISCONSIN

FLY DESTROYER

Application filed January 25, 1932. Serial No. 588,555.

My invention relates to devices for destroying flies, and more particularly to that type which provides a poisoned area of contact, and my main object is to design an article which is compact, yet provides a large area of contact for the flies.

A further object of the invention is to construct the novel fly destroyer with the fewest parts consistent with simple and efficient operation.

A still further object of the invention is to design the novel fly destroyer with means for keeping it moist for the entire period of its use, which is usually one season.

An additional object of the invention is to so construct the novel fly destroyer that it may not be taken apart by an infant or animal pet with the danger of its taking the poison.

With the above objects in view and any others that may suggest themselves from the specification and claims to follow, a better understanding of the invention may be had by reference to the accompanying drawing, in which—

Figure 1:
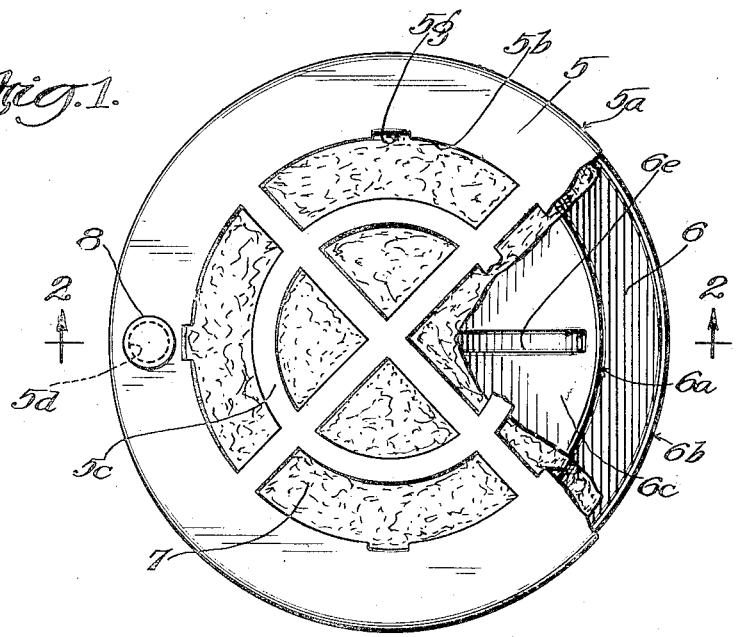
Fig. 1 is a plan view of the device, partly broken away.
Figure 2:
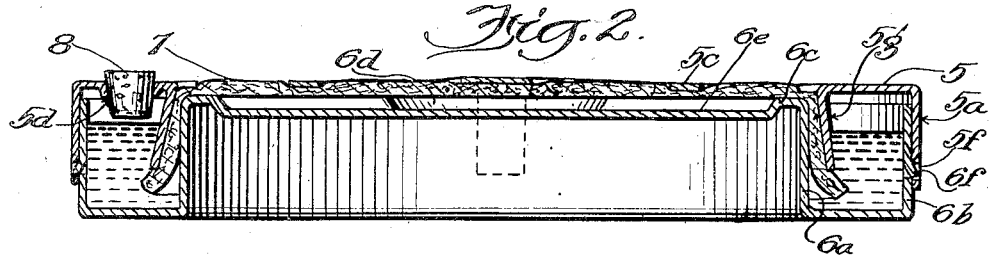
Fig. 2 is an enlarged section thereof, taken on the line 2—2 of Fig. 1.
Figure 3:
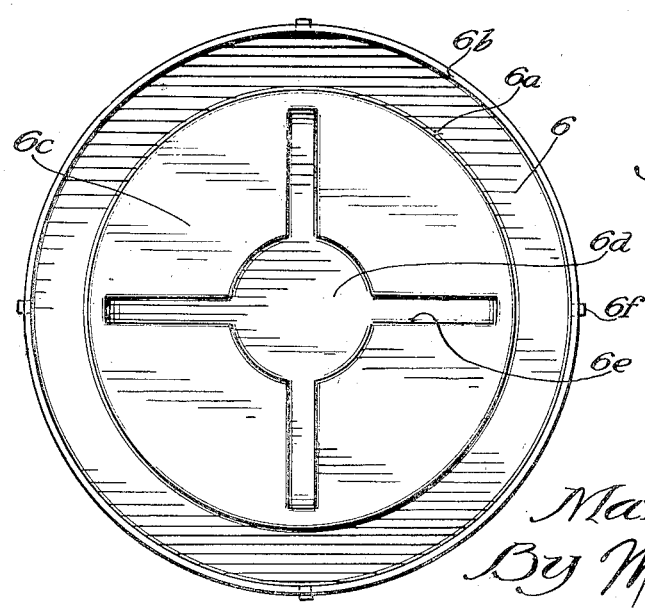
Fig. 3 is a plan view of the container forming part of the device.

Referring specifically to the drawing, it is seen that the novel fly destroyer is in the form of a flat circular box. This box comprises a top 5 and a bottom 6, these parts being of sheet metal.

The top 5 has a downward rim flange 5a and is cut out for the most part, as indicated at 5b, with a skeleton design of material 5c in the opening for a purpose soon to be made apparent. Also, the top is made with a smaller opening 5d near the edge.

The bottom 6 has upstanding concentric flanges 6a and 6b to provide an annular trough, the flange 6a being formed with a flat top 6c. The latter is sunken to some degree in the center, as indicated at 6d, and from the sunken portion extend radial channels 6e to points proximate to the edge of the top 6c.

The top 5 and bottom 6 are so dimensioned that the flange 5a of the former will make a snug overlapping fit with the flange 6b of the latter when the two are assembled. In order to fix the assembly from separation, the flange 5a is made with a series of perforations 5f which are adapted to register with lugs 6f projecting from the flange 6b when the top and bottom are joined, so that these parts close with a snap and are therefore locked.

Before assembling the upper and lower units of the device, a circular felt pad 7 is laid over the top 6c of the lower unit. The top 5 of the upper unit has depending lugs 5g which act when the units are assembled to depress the marginal portion of the felt pad 7 whereby to have the same dip into the trough of the lower unit. When the units are assembled, the open work 5c clamps the body of the pad firmly to the top 6c of the lower unit.

Before the units are assembled the depression 6d is filled with a solidified deposit of poisoned sugar; also, the pad 7 is impregnated with a fly poison solution—usually arsenic—and dried. Then a cork 8 is applied to the opening 5d to close the same.

When the device reaches the consumer, the instructions are to remove the cork 8 and pour a quantity of water into the trough of the lower unit.

This filling serves to soak the pad so that flies landing on it may feed on its moist surface and become poisoned. After sometime, when evaporation tends to dry the exposed portion of the pad, it will draw from the reservoir in the trough to continue in a moist state. When the filling is exhausted, the cork 8 is removed and a supply of water poured in. At the same time, the moisture will act to dissolve the surface of the sugar poison filling in the cavity 6d, so that the pad will also draw a charge of sweetened poison solution from the cavity and, by way of its branches 6e, the solution permeating the pad and providing an attraction for the flies.

It is thus seen that I have provided a fly destroyer which is not a temporary article like fly paper, usable for but a few days or a week, but a device which is self-restoring and vitalizing, and which may be depended upon to do its work without any attention other than occasional re-filling for a long time. Also, the article is of a nature to be made cheaply, so that its use for one season will suffice and the purchase of a new one for the next season will be a matter of small expense. The provision of the lateral opening 5d and the cork closure 8 therefor are to enable the device to be filled quickly. It will be realized that to fill it by simply pouring water over the pad may cause spilling on the outside quicker than the filling of the trough, so that the novel filling expedient applies directly to the trough and leaves the filling to be taken into the pad by capillary attraction. Finally, it will be noted that the major portions of the device are but the one-piece upper unit and the one-piece lower unit, making for exceeding simplicity and rigidity.

I claim:—

1. A fly destroyer comprising a box having a top opening, an absorbent pad under the latter, a water trough receiving the marginal portion of the pad, and a bottom inwardly of the water trough and having a raised portion supporting the pad from underneath, said raised portion having a medial depression for receiving a fly poison deposit, and radial channels extended from said depression for access of a solution of said deposit to outer portions of the pad.

2. A fly destroyer comprising a box having a medial top opening, an absorbent pad under the same, and a water trough under the pad and receiving the marginal portion thereof, the box top having a filler opening directly over the trough.

3. A fly destroyer comprising a box having a top opening, an absorbent pad under the latter, a water trough under the pad, the water trough extending marginally of the pad, and the marginal portion of the latter being deflected to dip into the trough, and means depressing the marginal portion of the pad to maintain said deflected position.

4. The structure of claim 3, said means comprising lugs depending from the box top.

5. A fly destroyer comprising a box having a top opening, an absorbent pad under the latter, a bottom having a raised medial portion supporting the pad from underneath, and a marginal wall defining said raised portion and forming a trough in conjunction with the bottom and outer wall of the box.

6. The structure of claim 5, the marginal portion of the pad overlapping said marginal wall and dipping into the trough.

7. The structure of claim 5, the marginal portion of the pad overlapping said marginal wall and dipping into the trough, said opening being somewhat larger than said raised portion, and lugs depending from the rim of the opening and pressing the overlapping portion of the pad down to maintain its dipping position.

8. A fly destroyer comprising a box having a top opening, an absorbent pad under the latter, a water trough receiving the marginal portion of the pad, and a raised bottom portion inwardly of the water trough and supporting the pad from underneath, said raised portion being medially sunken for receiving a fly-poison deposit.

In testimony whereof I affix my signature.

MARGARET JONES.